United States Patent Office 2,999,863
Patented Sept. 12, 1961

2,999,863
ALPHA-PHTHALIMIDO-ACETAMIDE DERIVATIVES
Sidney D. Upham, Pearl River, N.Y., assignor to Oklahoma State University of Agriculture and Applied Science, a corporation of Oklahoma
No Drawing. Filed July 27, 1953, Ser. No. 370,645
3 Claims. (Cl. 260—326)

This invention relates to the production of new aminoacetic acid derivatives having anticonvulsant activity and more particularly to the production of new alpha alpha disubstituted alpha phthalimido acetamides, and includes the new products and the method of producing them.

The new disubstituted phthalimido acetamides have respectively the following formula:

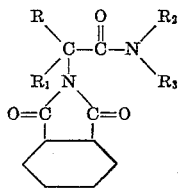

in which R and $R_1$ represent alkyl, cycloalkyl, alkenyl or aralkyl, or R and $R_1$ together represent cycloalkyl, and where $R_2$ and $R_3$ represent hydrogen, one or both of which can be substituted with alkyl, alkenyl, aralkyl or cycloalkyl or both hydrogens can be replaced by a cycloalkyl group.

The new phthalimido derivatives of the alpha alpha disubstituted acetamides are advantageously prepared from the corresponding phthalimido disubstituted acetic acids by reaction with thionyl chloride or phosphorus pentachloride to form the corresponding acid chlorides and by reacting the acid chlorides with ammonia or amines to form the amide or substituted amide.

The phthalimido derivatives of the alpha alpha disubstituted acetic acids are themselves advantageously prepared by first producing 5,5'-disubstituted hydantoins, hydrolyzing the hydantoins to form alpha alpha disubstituted aminoacetic acids, and converting these acids into the phthalimido derivatives. Some of these intermediate products are known and some are new. The invention includes the new intermediates and the methods for their production.

The following description illustrates the production of a number of the disubstituted hydantoins and of other intermediate products therefrom.

PREPARATION OF HYDANTOINS

The production of the hydantoins is illustrated by the following reaction:

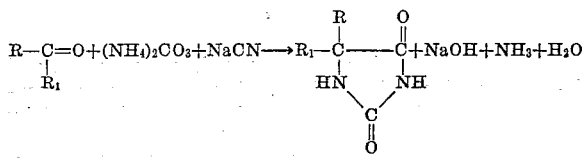

in which R and $R_1$ have the meaning previously referred to. A typical example illustrating the production of one of the hydantoins, namely, the pentamethylene hydantoin, is as follows:

Example 1

CHARGE

| | |
|---|---|
| 1.0 mole | Cyclohexanone |
| 1.1 mole | NaCN |
| 4.0 mole | $(NH_4)_2CO_3$ |
| 1,500 ml | 25% ethanol |

The above materials were charged to a three liter, 3-necked, round-bottomed flask equipped with mechanical stirrer and thermometer. Heat was supplied by a heating mantle connected to a variac. One neck of the flask was left open to vent the expelled gases into the hood. Good agitation was maintained during the course of the reaction. Heat was then applied and the contents of the flask held at an ambient temperature of 55° C. for four hours. Then the temperature of the contents of the flask was gradually raised during the following four hours until a temperature of 94° C. had been reached.

The product was isolated by allowing the solution to cool and collecting the precipitate. On acidification of the filtrate with mineral acid a second crop of crystals was obtained. The two crops of material were combined, washed with water, and then dried in vacuo for 72 hours over anhydrous $CaCl_2$.

The pentamethylene hydantoin had a melting point of 215–215.5° C. and was obtained with a yield of around 87%, and the material can be used without further purification.

In a similar way, other 5,5 hydantoins can be prepared, the 5,5 substituents being the R and $R_1$ groups of the above formula. The following table gives a number of such hydantoins, with their melting points:

5,5-DISUBSTITUTED HYDANTOINS

| 5,5-substituents: | M.P. (° C.) |
|---|---|
| Dimethyl | 177 |
| Methylethyl | 144–45 |
| Methyl-n-propyl | 123–24 |
| Methylisopropyl | 177 |
| Methylcyclopropyl | 146–8 |
| Methylisobutyl | 146–7 |
| Methyl-n-pentyl | 101 |
| Methyl-n-hexyl | 107–8 |
| 5,5-substituents: | M.P. (° C.) |
| Methylbenzyl | 227–8 |
| Diethyl | 165 |
| Ethylpropyl | 144–45 |
| Ethyl-n-butyl | 122–23 |
| Tetramethylene | 204–5 |
| Pentamethylene | 215 |
| Hexamethylene | 212–213 |

PREPARATION OF DI-SUBSTITUTED AMINOACETIC ACIDS

These compounds are prepared by hydrolysis of the corresponding hydantoin, according to the following equation:

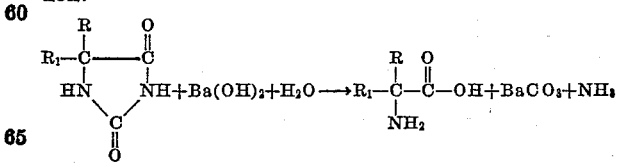

The following preparation of α-ethyl-α-propylaminoacetic acid is given as an example of the preparation of such an acid by hydrolysis of the corresponding hydantoin.

Example 2

CHARGE

| | | |
|---|---|---|
| 85 grams, ethylpropyl hydantoin | | .50 mole |
| 400 grams, Ba(OH)$_2$.8H$_2$O | | 1.27 moles |
| 1500 ml., H$_2$O | | solvent |

The above materials were charged in one portion into a three liter beaker and the contents of the beaker heated until the solids had dissolved. Then the beaker was placed in a pressure autoclave for 16 hours during which period a steam pressure of 20 p.s.i. was maintained. At the end of this period the BaCO$_3$ was filtered from the reaction mixture. The filtrate was freed from the excess Ba(OH)$_2$ by passing CO$_2$ through the mixture until neutral to pH paper. Again the resulting mixture was filtered and then the filtrate concentrated in vacuo until almost dry. The amino acid, which had precipitated out during the concentrating of the filtrate, was collected in a sintered-glass funnel, washed sparingly with ethanol, and finally dried in vacuo over CaCl$_2$.

In a similar manner, other 5,5'-disubstituted hydantoins such as those above referred to can similarly be converted into the disubstituted aminoacetic acids.

The following illustrative example describes the production of the alpha alpha diethyl alpha phthalimido acetic acid:

Example 3

α,α-Diethyl-α-aminoacetic acid (66 gms., ½ mole) was added to melted phthalic anhydride (74 gms., ½ mole) at 130° C. A mush formed which hardened up almost immediately, remelting when the temperature reached 160–65° C. The temperature was raised to 175°–185° C. and held there for 20 minutes. The melt was then cooled, 300 cc. of water added, and the mixture brought to 100° C. and filtered hot. The residue was dissolved in 500 cc. methanol treated with Norite and filtered. To the filtrate was added 750 cc. of hot water and the material allowed to cool and crystallize. The crystals were filtered and dried giving 70 gms. of α,α-diethyl-α-phthalimidoacetic acid (58% of the theoretical yield).

Other α,α-disubstituted-α-phthalimidoacetic acids were made similarly with varying yields.

The alpha alpha disubstituted alpha phthalimido acetic acids thus produced have the following formula:

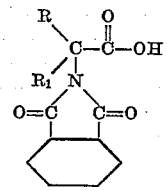

in which R and R$_1$ have the meaning previously indicated.

The following table is an illustrative table giving the melting points of a number of the phthalimido derivatives of alpha alpha disubstituted acetic acid:

α,α-DISUBSTITUTED-α-PHTHALIMIDOACETIC ACIDS

| R | R$_1$ | M.P. (° C.) |
|---|---|---|
| methyl | methyl | 152-3 |
| Do | ethyl | 137-8 |
| Do | n-propyl | 113-115 |
| Do | isopropyl | 159-161 |
| Do | cyclopropyl | 156-158 |
| Do | isobutyl | 133-35 |
| Do | n-pentyl | 95-96 |
| ethyl | ethyl | 163-64 |
| Do | n-propyl | 133-35 |
| tetramethylene | | 157-58 |
| pentamethylene | | 158-60 |
| hexamethylene | | 175-76 |

PREPARATION OF ALPHA ALPHA DISUBSTITUTED PHTHALIMIDO ACETAMIDES

The process of producing the amides from the acids is a two-step process. In the first step, the phthalimido disubstituted acetic acid is reacted with phosphorus pentachloride or thionyl chloride as an agent to convert the acid into the acid chloride. In the second step of the process, to produce the unsubstituted amides, the acid chloride is reacted with ammonia to convert the chloride into the amide. For the production of substituted amides in which one or both of the hydrogens are substituted by e.g. alkyl groups, the reaction of the acid chloride is with an amine instead of ammonia. In the first step of the process, benzene is desirably used as a solvent. It has been found that in the case of the phthalimido products, there is a tendency to undergo ring fission, with reduction in yield, and to avoid such side reactions it is advantageous to carry out the process rapidly and with only a short time of reaction.

The treatment of the alpha alpha disubstituted alpha phthalimido acetic acid is advantageously carried out with a 2 mole excess of thionyl chloride and by limiting the reaction to around 5 to 10 minutes in a steam bath; and then removing the excess thionyl chloride as rapidly as possible, and at as low a temperature as possible by vacuum distillation. The temperature is desirably kept around 35°–45° C. The acid chloride formed is then dissolved in dry acetone or dry dioxane and added to ammonium hydroxide solution at a temperature of —10° to —20° C., with rapid stirring and with refrigeration to avoid any considerable rise in temperature due to the heat of reaction. The reaction should be carried out rapidly and in a short period of time to reduce or minimize hydrolysis. The amide is stirred until solid and removed by filtration and crystallized from methanol and water.

The following illustrative example describes the production of the alpha ethyl alpha propyl alpha phthalimido acetamide:

Example 4

α-Ethyl-α-propyl-α-phthalimidoacetic acid (2.75 gms.–.01 mole) was added to thionyl chloride (1.4 cc.–.02 mole) and 20 cc. of benzene. This was heated on the steam bath for 10 minutes, cooled and the benzene and excess thionyl chloride removed by vacuum distillation. The residue was dissolved in 5 cc. of dry dioxane, then cooled to 0° C. and added to cold concentrated NH$_4$OH (40 cc.) at —10 to —20° C. The amide precipitated and rapidly crystallized and was removed by filtration and recrystallized from acetone and water.

In a similar manner, other alpha alpha disubstituted alpha phthalimido acetamides such as those in the following table can be similarly prepared. These unsubstituted amides have the following formula:

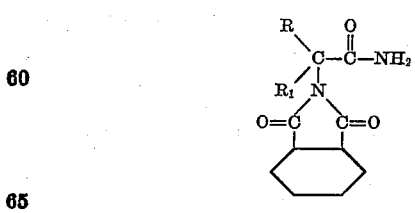

The following table gives the substituent groups R and R$_1$, the melting point and the nitrogen assay as calculated and found, and also the pharmacological activity obtained with oral doses of the amides.

The pharmacological activity was determined in accordance with the general method described by Toman et al. in the Journal of Neurophysiology, vol. 9, pages 231–239 (1946). In this method, white rats were subjected to the supermaximal electroshock test with corneal electrodes. The respective amides were administered orally in the doses indicated (milligrams per kilogram of body weight) and the figures 1+, 2+, 3+, 4+ indicate the effectiveness of the amide to stop the effect of the shock. The figure 1+ indicates that 2 or more out of 10 animals recovered. The figure 2+ indicates that 5 animals out of 10 recovered. The figure 3+ indicates that about 7 or 8 of the animals recovered. And the figure 4+ indicates that all of the 10 animals recovered from the effect of the shock. This test is a standard animal test for indicating the effectiveness of anticonvulsants. The results are given in the following table under the heading "Pharmacological Activity."

| $R_1$ | $R_2$ | Pharmacological Activity Mg./Kg. body Wt. | Nitrogen Calc. | Assay Found | M.P. (° C.) |
|---|---|---|---|---|---|
| Methyl | methyl | 3+ at 50 | 12.06 | 11.39 | 258–9 |
| Do | ethyl | 4+ at 40 | 11.30 | 11.25 | 208 |
| Do | n-propyl | 3+ at 50 | 10.76 | 10.90 | 174–75 |
| Do | isopropyl | 4+ at 30 | 10.76 | 10.40 | 168–69 |
| Do | cyclopropyl | 4+ at 45 | 10.85 | 10.50 | 187–89 |
| Do | isobutyl | 2+ at 50 | 10.22 | 10.46 | 170–71 |
| Do | n-pentyl | 2+ at 200 | 9.72 | 9.82 | 167–68 |
| ethyl | ethyl | 4+ at 30 | 10.76 | 10.88 | 190–91 |
| Do | n-propyl | 3+ at 100 | 10.22 | 10.50 | 155–56 |
| tetramethylene | | 1+ at 300 | 10.85 | 10.55 | 218–220 |
| pentamethylene | | 1+ at 500 | 10.29 | 10.42 | 225–26 |
| hexamethylene | | 1+ at 50 | 9.79 | 9.59 | 214–15 |

Substituted amides are similarly made by reacting the alpha alpha disubstituted alpha phthalimido acetyl chloride with an amine instead of with ammonia. The preparation of such substituted amides is illustrated by the following example, describing the preparation of the ethyl substituted alpha methyl alpha isopropyl alpha phthalimido acetamide.

Example 5

The acid chloride was made in the manner previously described from 26.1 gms. (0.1 mole) of α-methyl-α-isopropyl-α-phthalimidoacetic acid and added directly to 0.5 mole of ethylamine as a 70% aqueous solution. The reaction was kept at 0° during the addition and allowed to warm up and react for 30 minutes. An excess of 3 N HCl was added with stirring to remove the excess amine. The amide was removed by filtration, recrystallized from ethanol and water or isopropyl alcohol and Skelly B.

The substituted amides have the following formula:

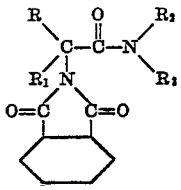

in which R and $R_1$ have the meaning previously referred to and $R_2$ and $R_3$ represent the substituent or substituents in the amide group.

The following table illustrates substituted amides produced in this way, with the melting point, nitrogen assay as calculated and found, and the pharmacological activity based on testing white rats to show the anticonvulsant activity of the product, in a manner similar to that described in connection with the above table.

| R | $R_1$ | $R_2$ | $R_3$ | Pharmacological Activity Mg./kg. body Wt. | Nitrogen Calc. | Assay Found | M.P. (° C.) |
|---|---|---|---|---|---|---|---|
| methyl | ethyl | H | ethyl | 2+ at 50 | 10.21 | 10.40 | 135–37 |
| Do | isopropyl | H | do | 1+ at 50 | 9.72 | 9.82 | 141–43 |
| ethyl | ethyl | H | do | 2+ at 50 | 9.72 | 9.85 | 144–47 |
| tetramethylene | | H | cyclohexyl | 1+ at 500 | 7.77 | 7.53 | 180–82 |

The anticonvulsant properties of the products by a standard animal test are illustrated by the foregoing tables. The diethyl phthalimido acetamide and the methyl ethyl phthalimido acetamide are especially valuable because of their high anticonvulsant activity and also because of their non-toxic properties.

I claim:

1. New alpha, alpha-disubstituted-alpha-phthalimido-acetamides having the following formula:

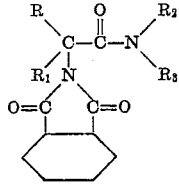

in which R and $R_1$ are selected from the group which consists of alkyl and cycloalkyl and R and $R_1$ together are cycloalkyl, and $R_2$ and $R_3$ are selected from the group which consists of hydrogen, alkyl and cycloalkyl groups.

2. Alpha, alpha diethyl alpha phthalimido acetamide having the following formula:

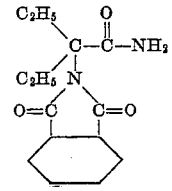

3. Alpha, alpha ethyl n-propyl substituted alpha phthalimido acetamide having the following formula:

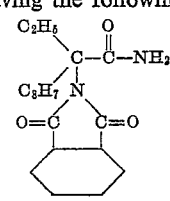

References Cited in the file of this patent

UNITED STATES PATENTS

| | | |
|---|---|---|
| 2,447,587 | Martin et al. | Aug. 24, 1948 |
| 2,496,882 | Martin et al. | Feb. 7, 1950 |
| 2,628,217 | Magat | Feb. 10, 1953 |
| 2,672,460 | Conroy | Mar. 19, 1954 |
| 2,676,188 | Bruce et al. | Apr. 20, 1954 |
| 2,744,118 | Cavalla | May 1, 1956 |
| 2,744,119 | Walton | May 1, 1956 |

FOREIGN PATENTS

| | | |
|---|---|---|
| 1,012,765 | France | Apr. 23, 1952 |
| 69,134 | Denmark | Apr. 25, 1949 |
| 69,749 | Denmark | Aug. 1, 1949 |

OTHER REFERENCES

Berichte: vol. 41, pages 798–799 (1908).
Beilstein's Hand. Org. Chem., 4th ed., main work, vol. IX, page 251; 2nd supplement, page 181.